United States Patent
Schmidl et al.

(10) Patent No.: US 7,440,484 B2
(45) Date of Patent: Oct. 21, 2008

(54) REDUCED HOPPING SEQUENCES FOR A FREQUENCY HOPPING SYSTEM

(75) Inventors: Timothy M. Schmidl, Dallas, TX (US); Anand G. Dabak, Plano, TX (US); Mohammed Nafie, Richardson, TX (US); Oren E. Eliezer, Kfar-Saba (IL)

(73) Assignee: Texas Instruments Incorporated, Dallas, TX (US)

( * ) Notice: Subject to any disclaimer, the term of this patent is extended or adjusted under 35 U.S.C. 154(b) by 1166 days.

(21) Appl. No.: 09/838,606

(22) Filed: Apr. 19, 2001

(65) Prior Publication Data

US 2002/0021746 A1  Feb. 21, 2002

Related U.S. Application Data

(60) Provisional application No. 60/223,950, filed on Aug. 9, 2000.

(51) Int. Cl.
*H04B 1/713* (2006.01)
(52) U.S. Cl. ...................................................... 375/135
(58) Field of Classification Search ................. 375/132, 375/133, 135, 136
See application file for complete search history.

(56) References Cited

U.S. PATENT DOCUMENTS

| | | | | |
|---|---|---|---|---|
| 5,225,902 A | * | 7/1993 | McMullan, Jr. | 725/121 |
| 5,323,447 A | * | 6/1994 | Gillis et al. | 455/464 |
| 5,737,359 A | * | 4/1998 | Koivu | 375/133 |
| 6,275,518 B1 | * | 8/2001 | Takahashi et al. | 375/135 |
| 6,334,057 B1 | * | 12/2001 | Malmgren et al. | 455/450 |
| 6,480,721 B1 | * | 11/2002 | Sydon et al. | 455/464 |
| 6,519,460 B1 | * | 2/2003 | Haartsen | 455/452.1 |
| 6,549,784 B1 | * | 4/2003 | Kostic et al. | 455/501 |
| 6,751,249 B1 | * | 6/2004 | Cannon et al. | 375/133 |
| 6,760,319 B1 | * | 7/2004 | Gerten et al. | 370/335 |

FOREIGN PATENT DOCUMENTS

DE  3415032 A1 *  8/1984

* cited by examiner

*Primary Examiner*—Kevin Y Kim
(74) *Attorney, Agent, or Firm*—Ronald O. Neerings; Wade James Brady, III; Frederick J. Telecky, Jr.

(57) ABSTRACT

A frequency hopping system such as a Bluetooth system (300) can reduce the number of RF channels it hops during a normal hopping sequence cycle providing for a Reduced Hopping Sequence (RHS). A communication unit operating in the system such as the Bluetooth master unit (302) determines if any of the RF channels has interference. If any of the channels has interference, the Bluetooth master sends a message to one or more slave units (304, 306) informing them of which channels will be removed from the hopping sequence due to potential interference problems. The units will then use the new RHS for their transmissions, thus avoiding the interference problems (e.g., both avoiding interference in the system's receivers and avoiding creating interference on frequencies that are already occupied by other neighboring systems).

16 Claims, 1 Drawing Sheet

*FIG. 1*
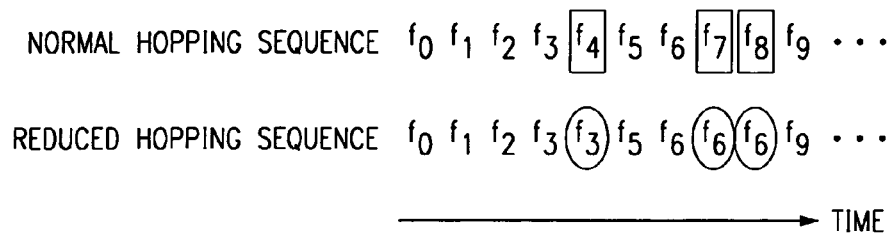
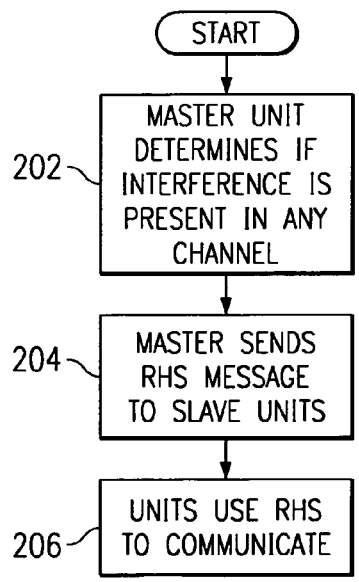
*FIG. 2*
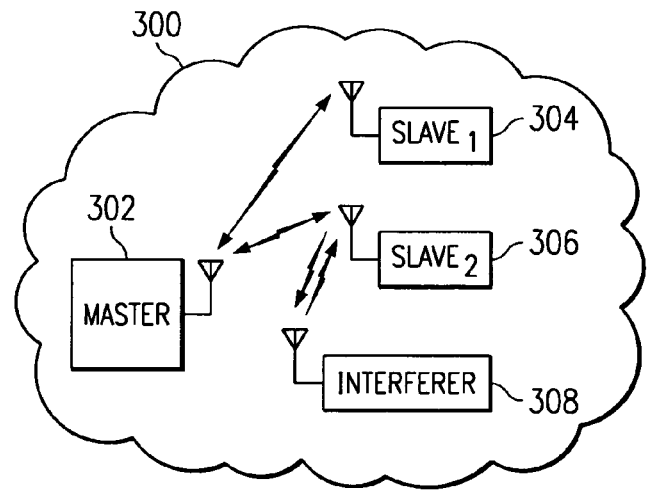
*FIG. 3*
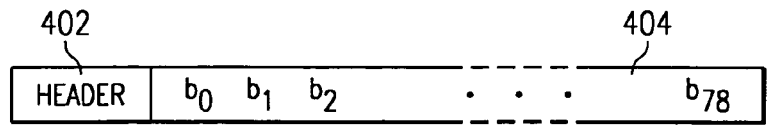
*FIG. 4*

REDUCED HOPPING SEQUENCES FOR A FREQUENCY HOPPING SYSTEM

CROSS-REFERENCE TO RELATED APPLICATIONS

This application claims the benefit of U.S. Provisional Application No. 60/223,950, entitled "Reduced Hopping Sequences (RHS) for Bluetooth", filed on Aug. 9, 2000.

TECHNICAL FIELD

This invention relates in general to the field of radio communications and more specifically to a method of reducing the hopping sequence in a frequency hopping system such as Bluetooth.

BACKGROUND

The Bluetooth system operates in the 2.4 Giga-Hertz (GHz) ISM (Industrial Scientific Medical) band. In the United States, the range of the frequency band is 2.400-2.4835 GHz. The Bluetooth system has channel spacing of 1 MHz and uses 79 radio frequency (RF) channels in its standard hopping sequence. The Federal Communications Commission (FCC) rules mandate that any system that operates under FCC regulation 15.247 must hop over at least 75 RF channels, and must use all the frequencies equally (i.e., the devices must spend the same average amount of time at each frequency). Since Bluetooth was designed to operate under FCC regulation 15.247, its hopping pattern is chosen so that approximately equal time is spent in each of the 79 frequencies. Problems with coexistence can arise when other devices share the ISM band with a Bluetooth system, such as IEEE 802.11b wireless local area networks (WLAN) or microwave ovens.

Interferers, which remain stationary in the ISM band, will greatly reduce the throughput of Bluetooth wireless networks and/or increase the packet error rate (PER) whenever the Bluetooth devices hop into the interfered channels. As an example, a Bluetooth connection carrying a voice conversation generally needs a PER of less than 5%. If a microwave oven is operating near the Bluetooth piconet and occupies a bandwidth of 10 MHz with a 50% duty cycle, then on average 5 RF channels will be unusable to the Bluetooth piconet. The PER floor due to interference from the microwave oven will be about 5/79=6%, which will result in poor voice quality. This invention provides a way to reduce the number of hopping channels so that interferers can be avoided in a frequency hopping system like Bluetooth.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

FIG. 1 shows a comparison of a normal hopping sequence and a reduced hopping sequence in accordance with the invention.

FIG. 2 shows a flow chart showing the steps taken in accordance with the invention.

FIG. 3 is a diagram illustrating a Bluetooth system in accordance with the invention.

FIG. 4 is a diagram showing a typical RHS packet that is used to inform the devices in the network of the RHS in accordance with the invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures.

The present invention is a method where the number of hopping frequencies (RF channels) in a frequency hopping system such as Bluetooth is reduced. This allows stationary interferers (in frequency) such as IEEE 802.11b WLAN's or microwave ovens to be avoided so that the throughput and PER of the Bluetooth system can be improved. In the preferred embodiment, the Bluetooth piconet master determines which frequency bands contain a strong interferer. This determination can be made by a probing technique that measures the quality of the RF channels. The quality of the RF channels can be measured using one of a number of channel quality measurements like $[E_b/(N_0+I_0)]$ where "$E_b$" stands for bit error, "N" stands for noise and "I" stands for interference, the RSSI (received signal strength indicator) or some other signal quality indicator is measured for each of the RF channels in the standard hopping sequence. In the United States, the standard hopping sequence must have at least 75 channels to be compliant with current FCC regulation 15.247. Alternatively, the master radio can simply monitor the PER on each channel to find which RF channels in the standard hopping sequence have a large PER and should be avoided.

Once the master radio determines the RF channel(s) to avoid, the master can communicate this information to enhanced slave units that are capable of supporting the reduced hopping sequences (RHS) of the present invention. The master device radio can then communicate with the enhanced slaves using RHS, but will continue to communicate with normal Bluetooth slaves using the normal Bluetooth hopping sequence (i.e., using all of the 79 RF channels). The enhanced slave units are those slave units that are programmed in accordance with the present invention to accept a reduction in the number of RF channels used in their hopping sequences.

One way of generating the RHS is illustrated in FIG. 1. In FIG. 1, ten frequencies of the normal Bluetooth hopping sequence are designated as $f_0$ to $f_9$. This figure simply illustrates a segment of the hopping sequence to show how the RHS is generated. In this example, let $f_4$, $f_7$ and $f_8$ be three RF channels (shown in boxes) in the set that need to be avoided due to interference. These RF channels are not used in the RHS, and instead in one example, the previous available RF channel in the sequence is substituted for these avoided frequencies.

In FIG. 1, the circles illustrate which RF channels are changed in the RHS. Since $f_4$ is to be avoided, the previous non-interfered with RF channel $f_3$ is used instead of $f_4$ in the preferred embodiment. Similarly, $f_7$ and $f_8$ are to be avoided, so $f_6$, the previous RF channel to $f_7$ in the standard hopping sequence, is used instead. One advantage of this method of generating the RHS is that all the remaining RF channels are used equally on average. Another advantage is that the difference in the normal hopping sequence and RHS is minimized, which makes it easier for a master radio to support both normal and enhanced Bluetooth slaves. Other methods of forming the RHS can be used such as a modulo operation where the RF channels that are to be avoided (and replaced) are mapped into other RF channel, etc. The system designer can design the appropriate RHS scheme depending on his system needs and the potential interferes the system may encounter.

Systems that use the RHS no longer qualify under FCC regulation 15.247, but they still qualify under FCC regulation 15.249. Under regulation 15.249, devices are permitted to transmit an average power of:

[(0.75 milli-watt)×(number of RF channels used for hopping with 1 MHz bandwidth)].

If the RHS uses 60 RF channels, then the devices can transmit 45 mW or 16.5 dBm. Most current Bluetooth devices are designed to transmit 0 dBm (1 mW), and the cost of the Bluetooth devices will increase when the power output is over a few milli-watts, since an additional power amplifier is typically needed for higher transmission power. Thus, the power restrictions under regulation 15.249 should not be a significant limitation to enhanced Bluetooth devices using the present invention. Furthermore, in many regions outside the United States, power levels in the order of 100 mW (milliwatt) are allowed with much fewer hopping channels (e.g., 20).

There are several ways the master device can choose the reduced hopping sequences. The master can decide individually whether or not to use each of the 79 RF channels by monitoring for interferers in each of the RF channels. The master can then send a packet with 79 information bits which represent the 79 frequencies (RF channels) to indicate whether each one is to be used or not.

Alternatively, the Bluetooth master device can chose whether to use predetermined groups of RF channels. Since IEEE 802.11b devices, which are one of the potential interferers, typically use one of three 22 MHz bands, the master device can group its RF channels according to the 802.11b frequency plan. If it is determined by the master unit that an 802.11b network is using one or more of these bands, the master can indicate to the enhanced slaves in the system not to use the affected frequency groups. A frequency group for the microwave oven band can also be used. Using predetermined groupings will decrease the amount of information that the master needs to communicate to the enhanced slaves on which RF channels to avoid. In this case, the information transmitted to the enhanced slaves does not require 79 bits and can be transmitted using much less bits of information. The predetermined RF channel groupings can be preprogrammed into the master and slave units, and in that way, less information needs to be transmitted by the master in order to let the slave units know which RF channels will be used.

In FIG. 2, there is shown a flowchart highlighting some of the steps taken in accordance with the invention. In step 202, the master unit determines, using one of the previously discussed techniques, if interference is present in any of the Bluetooth RF channels. If it is determined that interference is present, in step 204 the master unit sends a message to the slave units programmed to accept the RHS scheme (referred to as enhanced slave units). The message allows the slave units to determine the reduced hopping sequence that will be used and what channels will be omitted from the sequence. Depending on the particular design, the message may also provide information as to what RF channels (e.g., previous non-interfered with channel) will replace, if any, the omitted channels, bandwidth of each of the channels, etc. As mentioned previously, other channels beside the previous channel to an interfered with channel can replace the omitted channels.

A sample RHS message for use in step 204 is shown in FIG. 4. The message 400 includes a header 402 and a section 404 that includes 79 bits corresponding to each of the RF channels available in the Bluetooth system. In one illustrative example, a "1" in a corresponding bit in section 404 informs the receiving radio(s) that a particular RF channel is in the RHS. A "0" in one of the bits means that channel is excluded from the RHS. In the preferred embodiment, the receiving radio would also know to use the channel preceding the excluded channel as previously discussed in association with FIG. 1. This information as to what channel to use for the excluded channel(s) can be preprogrammed into all the communication units in the system, or can be sent in other packets by the unit transmitting the RHS message. Finally, in step 206 the master and slave units communicate with each other using the RHS, thereby avoiding the potential interference that had been detected by the master unit.

In FIG. 3, there is shown a frequency hopping system 300 such as a Bluetooth system in accordance with the invention. The system comprises a master unit 302 and one or more slave units 304, 306. A potential interferer such as a microwave oven or WLAN 308 is shown in RF proximity to the Bluetooth system.

Although the above discussion has focused on the Bluetooth master as the device in the Bluetooth system that monitors for interferers, and transmits messages to the slave units, in an alternate embodiment, one or more of the slave units in the system could be assigned to perform these tasks. In another embodiment, the device or devices in charge of deciding the RHS can also control the bandwidth of the hopping channels, for example, they could make one of the channels in the RHS a 4 MHz channel instead of the standard 1 MHz, if conditions warrant it.

In still another embodiment of the invention, one of the communication units in the Bluetooth piconet such as the piconet master, could be a dual mode device which is capable of operating in both WLAN (or other potential type of interfering system to the Bluetooth system) and Bluetooth networks. In such a situation, the communication device can use its knowledge of both of the systems to allocate some of the RF channels to the WLAN activity (first system) and use some or all of the other available RF channels for the RHS for use in the Bluetooth system (second system). This allocation by one communication device common to both systems can help minimize interference between the two systems.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, similar methods can also be used to reduce the number of RF channels used in other systems and under other regulations.

The invention claimed is:

1. A method for modifying RF channels used in a frequency hopping system having a standard hopping sequence that uses a predetermined number of RF channels, the frequency hopping system including a plurality of communication units amongst which there includes a master unit and one or more slave units, the method comprising the steps of:

(a) determining by one of the plurality of communication units if any of the RF channels in the standard hopping sequence are being interfered with, wherein said one of the plurality of communication units comprises a dual mode device that operates in two types of frequency hopping systems each having at least some of its RF channels overlapping with the other system, and the communication unit uses its information on the two types of systems to allocate the RF channels to each of the two systems in order to minimize interference amongst the two systems; and (b) sending a message by the unit performing step (a) to the one or more other communication unit(s) amongst the plurality which allows them to set up a reduced hopping sequence (RHS) that informs them of an RF channel in the standard hopping sequence to be removed and replaced with a previous RF channel in the standard hopping sequence.

2. A method as defined in claim 1, wherein the communication unit in step (a) determines if one or more RF channels are being interfered with by measuring the packet error rate (PER) for each of the RF channels in the standard hopping sequence.

3. A method as defined in claim 1, wherein the communication unit in step (a) determines if one or more RF channels are being interfered with by measuring the received signal strength indicator (RSSI) for each of the RF channels in the standard hopping sequence.

4. A method as defined in claim 1, wherein the communication unit in step (a) determines if one or more RF channels are being interfered with by measuring $E_b/(N_0+I_0)$ for each of the RF channels in the standard hopping sequence.

5. A method as defined in claim 1, wherein the communication unit in step (a) determines if one or more RF channels are being interfered with by checking CRC information found in a header of any packets being transmitted in the RF channels.

6. A method as defined in claim 1, further comprising the step of: communicating between the one or more slave units and the master unit after step (b) using the reduced hopping sequence (RHS).

7. A method as defined in claim 1, wherein the frequency hopping system comprises a Bluetooth system.

8. A method as defined in claim 1, wherein the master unit can communicate with one or more slave units using the reduced hopping sequence and with other slave units using the standard hopping sequence.

9. A method as defined in claim 1, wherein the RF channels found in the standard hopping sequence are grouped in a plurality of groups and the message sent by the communication unit in step (a) informs the other communication units from amongst the plurality which of groups to use in forming the reduced hopping sequence (RHS).

10. A method as defined in claim 1, wherein step (a) is performed by the master unit.

11. A method as defined in claim 1, wherein step (a) is performed by one or more of the slave units.

12. A method as defined in claim 1, wherein the message sent in step (b) also includes information on the bandwidth of the RF channels that comprise the RHS.

13. A method of forming a modified hopping sequence from a standard hopping sequence having a predetermined number of channels in overlapping channel groups, comprising the steps of:
 determining an interference level of a first channel of a wireless local area network (WLAN) channel group;
 determining an interference level of a second channel of a Bluetooth channel group; and
 sending a message indicating the second channel should be replaced by the first channel.

14. A method as in claim 13, wherein the determining step comprises measuring the packet error rate (PER) of the plurality of channels in the standard hopping sequence.

15. A method as defined in claim 13, wherein the determining step comprises measuring $E_b/(N_0+I_0)$ of the plurality of channels in the standard hopping sequence.

16. A method as in claim 13, wherein the determining step comprises checking CRC information found in a header of a packet being transmitted on the plurality of channels.

* * * * *